Patented Oct. 10, 1950

2,524,838

UNITED STATES PATENT OFFICE 2,524,838

ESTERS OF PYRIDYL-3-CARBINOL

Reinhard Schläpfer, Basel, Switzerland, assignor to Hoffmann-La Roche Inc., Nutley, N. J., a corporation of New Jersey No Drawing. Application April 29, 1947, Serial No. 744,773. In Switzerland June 4, 1946

1 Claim. (Cl. 260—295.5)

This invention relates to esters of pyridyl-3-carbinol.

It has been found that pyridyl-3-carbinol esters of aliphatic and heterocyclic organic acids cause dilatation of the capillaries and, in so doing, cause a diminution in blood pressure. These esters may be administered orally or parenterally to human beings without having an irritating effect and are well tolerated.

Esters of pyridyl-3-carbinol of the following general formula:

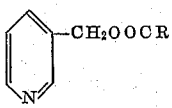

where RCO is the functional group of the aliphatic or heterocyclic organic acid used, may be obtained by reacting pyridyl-3-methyl-alcohol or halide with aliphatic and heterocyclic organic acids.

Thus, pyridyl-3-methyl-alcohol may be reacted with the free aliphatic or heterocyclic organic acids, their anhydrides or halides, or a metal derivative of pyridyl-3-methyl-alcohol may be reacted with the organic acid halide, or pyridyl-3-methyl-halide may be reacted with a salt of the organic acid, to give the required esters. The invention is intended to embrace all obvious chemical equivalents of the above mentioned procedures.

The said esters of pyridyl-3-carbinol are intended for pharmaceutical use.

The following examples show how the process of the present invention may be carried into effect.

Example 1

54.5 parts by weight of pyridyl-3-carbinol are boiled with 3 times their quantity of 98% formic acid for 6 hours. Excess formic acid is removed under reduced pressure and the residue is taken up in chloroform. Potassium carbonate is added to the chloroform solution; after filtering, the latter is distilled under reduced pressure; after a fore-run consisting of chloroform, 3-formyloxy-methyl-pyridine passes over at 108° C. under a pressure of 9 mm. Hg. It is a colorless liquid miscible with water in any desired proportion. Yield: 70% of the theoretical.

Example 2

56 parts by weight of acetic anhydride are added dropwise to a solution of 54.5 parts by weight of pyridyl-3-carbinol in 30 parts by weight of glacial acetic acid, while cooling. The mixture is refluxed for 4 hours and then worked up as described in Example 1. 3-acetoxymethyl-pyridine, boiling at 118° C. under a pressure of 12 mm. Hg. is obtained in a yield amounting to 95% of the theoretical.

Example 3

75 parts by weight of propionic acid anhydride are added to a solution of 61 parts by weight of pyridyl-3-carbinol in 43 parts by weight of propionic acid. The mixture is heated to 140° C. on an oil bath for 6 hours. After driving off propionic acid, the residue is treated with potassium carbonate and fractionated in vacuo. Propionic-acid-β-picolyl ester, of boiling point 129° C. under a pressure of 9 mm. Hg., is obtained in a yield of 84%.

Example 4

Butyric-acid-β-picolyl ester is obtained from pyridyl-3-carbinol and butyric acid anhydride according to the method described in Example 3. The compound distils at 120° C. under a pressure of 9 mm. Hg. The yield is 89%.

Example 5

72 parts by weight of nicotinic-acid-chloride are dissolved in 200 parts by volume of anhydrous pyridine, and a solution of 54.5 parts by weight of pyridyl-3-carbinol is added while shaking. After cooling down, crystalline hydrochloride of nicotinic-acid-β-picolyl ester separates from the solution. By concentration of the mother-liquor to one third of its original volume, further quantities of the said hydrochloride may be obtained. The crude yield is 80%. After recrystallisation from alcohol, the solution shows a melting point of 157–159° C. Upon treatment of an aqueous solution of the said crystals with ammonia or potassium carbonate, the ester-base separates in form of an oil. It is taken up in chloroform and dried with potassium carbonate. After driving off the solvent in vacuo, the residue may be crystallised from petroleum ether or ligroin. The needles of nicotinic-acid-β-picolyl ester thus obtained melt at 47° C.

Example 6

54.5 parts by weight of 3-chloro-methyl-pyridine-hydrochloride, obtained by reacting pyridyl-3-carbinol-hydrochloride with phosphorus-pentachloride, are gradually added to a solution of 70 parts by weight of dehydrated potassium acetate in 100 parts by weight of glacial acetic acid at 100° C., while stirring. The said temperature is maintained for a further 3 hours. The precipitate formed is removed by filtration and washed with acetic acid and chloroform, and the main part of the solvent is driven off from the filtrate in vacuo. Further isolation of the pyridyl-3-carbinol-acetate obtained is effected according to Example 2, as above. The yield amounts to 30% of the theoretical.

I claim:

The nicotinic-acid-β-picolyl ester which can be represented by the following formula:

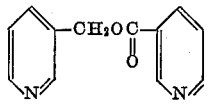

REINHARD SCHLÄPFER.

REFERENCES CITED

The following references are of record in the file of this patent:

UNITED STATES PATENTS

| Number | Name | Date |
|---|---|---|
| 1,611,978 | Wolffenstein | Dec. 28, 1926 |
| 2,349,267 | Harris | May 23, 1944 |
| 2,431,558 | Huber | Nov. 25, 1947 |

OTHER REFERENCES

Strong: J. American Chem. Soc., vol. 55 (1933), pp. 816–822.

Panizzon: Helvitica Chemical Acta, 24, pp. 24–28 E (1941).

Blicke: J. Amer. Chem. Soc., July 1942 (pp. 1721–1724).

Badgett: J. Amer. Chem. Soc., July 1945, pp. 1135–1138.

Chem. Abstracts, vol. 36, p. 5175.